United States Patent
Evers et al.

(10) Patent No.: US 6,234,063 B1
(45) Date of Patent: May 22, 2001

(54) SOLID STATE CONTROLLED POPCORN MACHINE

(75) Inventors: Gilbert J. Evers, Lansing, IL (US); Nenad Vidojevic, Chasterton, IN (US); Charles D. Cretors, Lake Forest, IL (US)

(73) Assignee: C. Cretons and Company, Chicago, IL (US)

(*) Notice: Subject to any disclaimer, the term of this patent is extended or adjusted under 35 U.S.C. 154(b) by 0 days.

(21) Appl. No.: 09/680,347

(22) Filed: Oct. 5, 2000

(51) Int. Cl.[7] .......................................... A23L 1/18
(52) U.S. Cl. .................... 99/323.7; 99/323.9; 99/348
(58) Field of Search .................. 99/323.5, 232.6, 99/323.7, 323.8, 323.9, 323.11, 348, 483, 486, 330; 219/420–422, 512, 494, 508; 426/233, 520, 523

(56) References Cited

U.S. PATENT DOCUMENTS

| | | | |
|---|---|---|---|
| 2,123,663 | * 7/1938 | Roach | 99/323.7 |
| 2,549,449 | 4/1951 | Gibson . | |
| 2,586,347 | 2/1952 | Kloster . | |
| 2,654,823 | 10/1953 | Altemiller . | |
| 2,812,704 | * 11/1957 | Hawks | 99/323.6 |
| 2,856,841 | * 10/1958 | Cretors et al. | 99/323.8 |
| 2,907,264 | 10/1959 | Bashway . | |
| 2,939,379 | * 6/1960 | Schmitt | 99/323.11 |
| 3,095,326 | 6/1963 | Green et al. . | |
| 3,554,115 | * 1/1971 | Manley et al. | 99/323.7 |
| 3,739,953 | * 6/1973 | Cretors | 99/323.8 |
| 4,120,236 | * 10/1978 | Blomberg | 99/323.9 |
| 4,178,843 | * 12/1979 | Crabtree et al. | 99/323.8 |
| 4,182,229 | 1/1980 | VandeWalker . | |
| 4,288,686 | 9/1981 | Cretors . | |
| 4,763,568 | * 8/1988 | Kiczek | 99/323.5 |
| 5,033,363 | 7/1991 | King et al. . | |
| 5,035,173 | * 7/1991 | Stein et al. | 99/323.7 |
| 5,301,601 | * 4/1994 | Cretors | 99/330 X |
| 5,397,219 | 3/1995 | Cretors . | |
| 5,555,792 | * 9/1996 | Stein et al. | 99/323.9 |
| 5,590,582 | * 1/1997 | Weiss | 222/105 X |
| 5,662,024 | 9/1997 | Cretors . | |
| 5,694,830 | 12/1997 | Hodgson et al. . | |
| 5,743,172 | 4/1998 | Weiss et al. . | |
| 5,871,792 | 2/1999 | Weiss et al. . | |
| 6,000,318 | 12/1999 | Weiss et al. . | |

\* cited by examiner

*Primary Examiner*—Timothy F. Simone
(74) *Attorney, Agent, or Firm*—Mayer, Brown & Platt (57) ABSTRACT

A solid state controlled popcorn machine is disclosed which is used in conjunction with a popcorn machine. The components of the machine are electronically controlled by a controller which is a programmable microprocessor. The controller has a user interface with programming keys and a visual display. The cooking cycle for popcorn is automatically programmed to add a selected amount of oil in a kettle. The kettle is heated for a selected amount of time at a certain temperature and the corn is agitated by an agitator. The parameters of the cooking cycle may be adjusted by a variety of programming buttons. The popcorn machine also has a blower, lights and a heater for the storage of completed popcorn. These elements are also controlled by the controller and may be adjusted via programming keys and the display. The mechanical elements are connected to fuses which are coupled to the controller. The controller will monitor the functioning of the elements as well as the heat of the kettle and issue an alarm and a visual warning on the display. The controller will also record data on machine operations in a connected memory. The data may be down loaded from the memory.

25 Claims, 7 Drawing Sheets

SOLID STATE CONTROLLED POPCORN MACHINE

FIELD OF INVENTION

This invention relates to machines used for preparing popcorn and more specifically, to a popcorn machine which uses a solid state controller to automatically control the popping operation.

BACKGROUND OF INVENTION

Popcorn popping machines for concession stand, restaurant or home use are well known. Generally, such popping machines have a cabinet or case in which the popcorn is both cooked and stored. The unpopped corn (kernels) is typically loaded into a kettle suspended from the top of the popcorn case, combined with cooking oil, and heated. The kettle has electrical heating elements to heat the oil and corn kernels and thereby effect popping of the kernels. As the popcorn fills the kettle, an initial portion of the popcorn discharges into the popcorn case and the remainder is subsequently dumped out of the kettle. An exhaust blower is used to vent the interior of the case. The oil is typically stored in a solid form and liquefied by a heating element just before the oil is needed.

In popcorn machines known presently, the various parts of the machine such as oil injection, kettle heating and exhaust systems are activated manually. Thus, the user must correctly add popcorn and oil, activate the kettle heat, and turn off the kettle heat when finished. Previously, thermostats have been used to control kettle heat at an operating temperature of around 500° F. and to prevent the cooking kettle from reaching unacceptably high temperatures. Further, with manual operations the user is subject to risk of injury from any direct contact with hot oil, kettle or heating elements.

Recently, electronic controls have been introduced to automate various parts of the cooking cycle. Using such electronic controls, monitoring popping functions has been possible. This has made the popping operation more efficient, however, the level of electronic control still requires the monitoring of many functions. Additionally, manual labor is required to clean and reset the popping machine. Finally, with automation, cooking parameters such as temperature control, corn and oil amounts, and activation times must be manually set. Such settings often require use of variable analog circuit components such as DIP switches which require the machine to be shut down and such switches are difficult to access.

Thus, there is a need for an automated popcorn controller which controls the popping operation. There is a further need for an automated popcorn controller which permits cooking parameters to be adjusted without having to reset analog circuit components. There is also a need for a controller that provides automated functions for maintenance and monitoring purposes. There is also a need for an automated controller which stores operation data to determine machine finction for diagnostic analysis.

SUMMARY OF THE INVENTION

These needs may be addressed by the present invention which is embodied in an operation system used in combination with a popcorn machine. The popcorn machine includes a case for holding popped corn, an electrically heated popcorn kettle located within the case and an oil pump operably connected to a source of popping oil to supply oil to the popcorn kettle. The system has electrical circuitry for connecting the kettle and oil pump to a source of electricity. The system also has a processor operably connected to the electrical circuitry to programmably control operation of the kettle and oil pump during a cooking cycle of activating the oil pump to add oil to the kettle, heating the kettle at a set temperature to produce popcorn. A display is coupled to the processor and shows selection choices to change operating parameters for the cooking cycle.

The invention is also embodied in a control system in combination with a popcorn machine. The popcorn machine includes an area for holding popped corn, an electrically heated popcorn kettle located within the case and an oil pump operably connected to a source of popping oil to supply oil to the popcorn kettle. The system has electrical circuitry for connecting the kettle and oil pump to a source of electricity. The system also has a microprocessor operably connected to the electrical circuitry to programmably control operation of the kettle and oil pump during a cooking cycle of activating the oil pump to add oil to the kettle and heating the kettle at a set temperature to produce popcorn. A memory is coupled to the processor and stores the number of times a cooking cycle is activated for a set period of time.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 1:
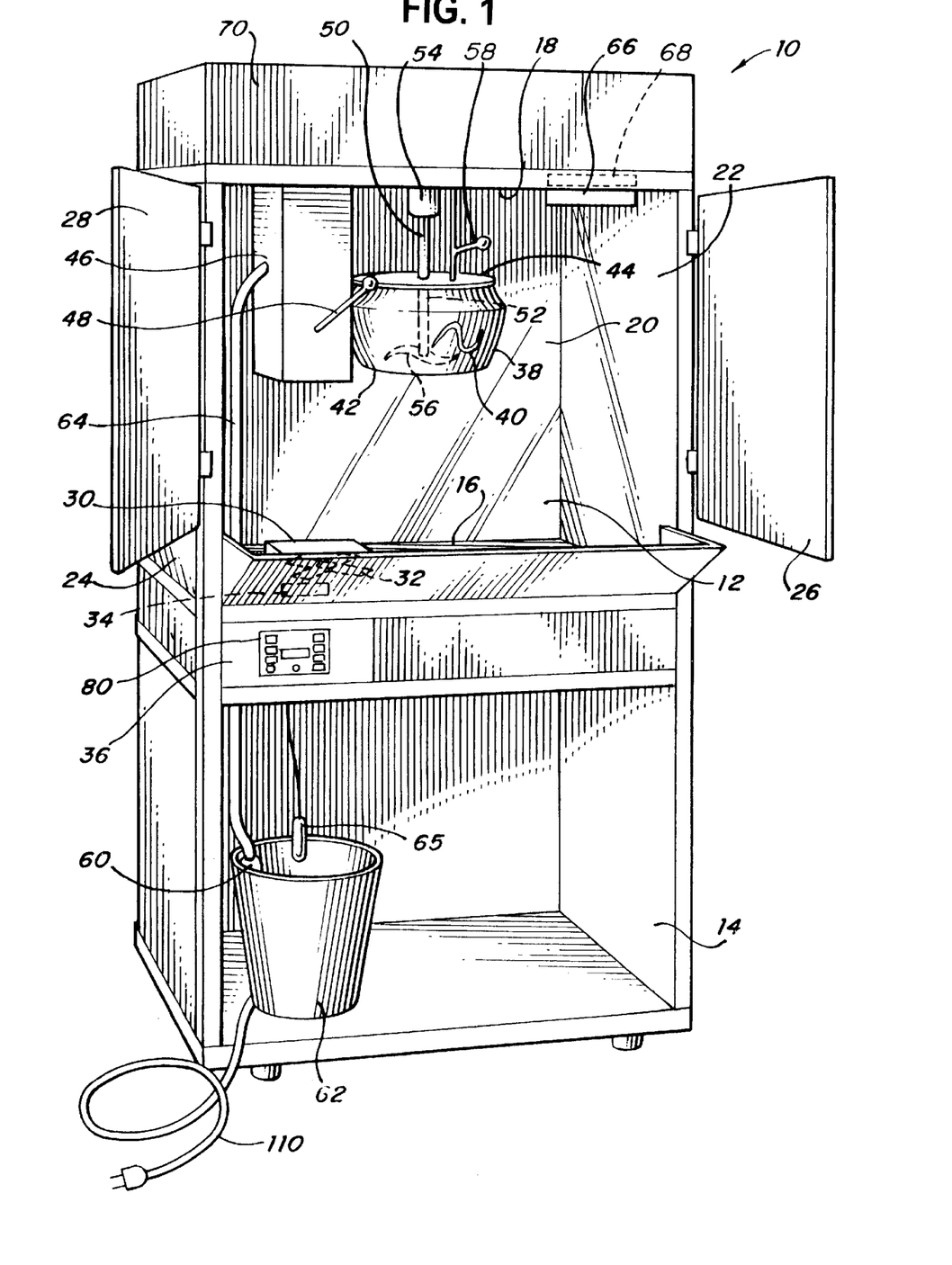
FIG. 1 is a perspective view of the operator's side of a popcorn machine according to the present invention.

FIG. 1 shows a perspective view of the operator side view of a popcorn making machine 10 which can incorporate an operating control system according to the present invention. Popcorn machines are generally stand alone units which are used for the intermittent to continuous production of popcorn. These machines are capable of being operator controlled to produce quantities of popcorn varying according to demand. The popcorn machine 10 includes a popcorn case or cabinet 12 within which popcorn is both produced and stored. Popcorn machine 10 also includes a storage section 14 which may be used to store supplies such as extra popping kernels, oil, containers and the like.

The popcorn case 12 has a flat bottom shelf 16, a flat top wall 18 and is enclosed by a panel 20 and a pair of side walls 22 and 24. The panel 20 and the side walls 22 and 24 are typically made of tempered glass, plexiglass or other clear material to allow a view of the popping process, as well as the completed popcorn which is stored in the popcorn case 12. Access to the popcorn case 12 is provided by means of a pair of hinged doors 26 and 28, which are also made of plexiglass, to permit the operator to carry out cooking operations and to dispense popcorn when desired.

The popcorn case 12 has a hot air recirculating conditioner 30 mounted under the bottom shelf 16 and between the popcorn case 12 and the storage section 14. The conditioner 30 includes a blower 32 and a heating element 34 which operate in conjunction to force hot air through the popped corn in the popcorn case 12 to keep it warm until it is ready to be served. A control unit 36 is also mounted under the bottom shelf 16 and between the popcorn case 12 and the storage section 14.

The popcorn kernels are placed into a kettle 38 which is suspended from the top wall 18 of case 12. The kettle 38 is constructed of stainless steel and has heating elements 40 located in its walls. The heating elements 40, when activated, are utilized to heat oil contained within the kettle 38 and to pop the kernels of corn placed into the kettle 38 by the operator. A thermocouple 42 is located on the kettle 38 to sense the temperature of the kettle 38. The thermocouple 42 is connected to the control unit 36.

The kettle 38 is supported on a pivot axis (not shown) carried within support column 46 extending from the top wall 18 of the popcorn case 12. A kettle dump handle 48 is connected to the pivot axis of the kettle 38 so that by rotating the dump handle 48, the kettle 38 maybe tipped on the pivot to allow popped popcorn to be discharged from kettle 38 into popcorn case 12.

The kettle 38 has a cover 44 which is circular in shape and is suspended by means of a support rod 50 which is extends through the center of the cover 44. The support rod 50 encloses a drive shaft 52 which is connected to a motor 54 on one end and is connected at the other end to an agitator 56 having a number of mixing blades. The agitator 56 is rotated by the motor 54 to agitate the kernels in the kettle 38. The kettle cover 44 may be opened via a cover lift rod 58 to add kernels.

An oil pump 60 is operably positioned in an oil container 62 which is located within the storage section 14. The oil container 62 is a 50 pound pail in this example but may also be a container which a bag of oil in a corrugated cardboard container for easy replenishment of oil. The oil pump 60 draws oil from the oil container 62 through a tube 64 which allows the oil to flow into the kettle 38. Typically, the oil is initially in solid form in container 62 and is liquefied by a heating element 65 which is inserted into the solid oil to melt the solid oil. After the oil is liquefied, the heating element 65 is operated for about 30 minutes prior to initiation of popping operations, the oil pump 60 is inserted into the oil container 62 and can then be used to inject oil into the kettle 38 via the tube 64, as desired. When the oil has been completely consumed, the entire oil container 62 may be replaced by a new container of oil.

An exhaust blower 66 is mounted on the top wall 18 of the popcorn case 12 for venting the interior thereof. A charcoal filter 68 is included as part of the exhaust blower 66 which serves to vent the popcorn case 12. Thus any undesirable odors may be reduced and airborne oils eliminated from the area around the popcorn machine. The exhaust blower 66 is coupled to and controlled by control unit 36. A light 70 is mounted in the top wall 18 to illuminate the popcorn case 12.

The user may initiate the operation of the popcorn machine 12 via a control panel 80 which is mounted below the hinged doors 26 and 28. A power cord 110 is connected to the control unit 36 to provide the popcorn machine 12 with the necessary electrical power to operate the various components. The power cord 110 is a conventional three line power line which may be plugged into a normal 120 volt power source.

Figure 2:
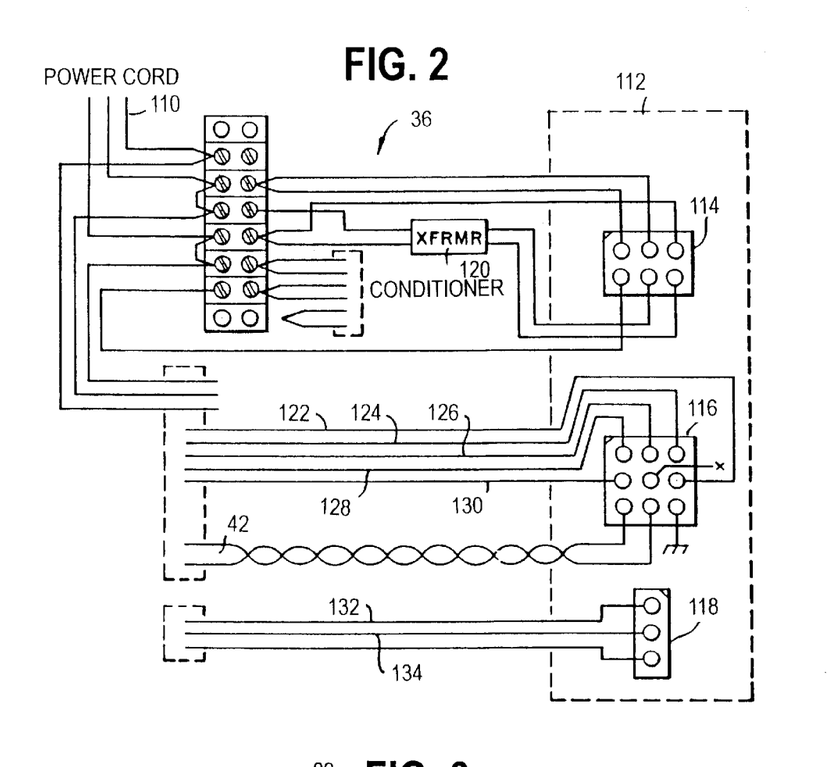
FIG. 2 is a block diagram of the control unit according to the present invention.

All of the machine elements described above are operatively interconnected and functionally controlled by the control unit 36 as shown in FIG. 2. The control unit 36 is activated by buttons mounted in control panel 80 and the buttons are each lighted during the time in which each respective operation is functioning.

Referring to FIG. 2, there is shown a block diagram of the control unit 36 according to the present invention. The control unit 36 has a printed circuit board 112 having a 6 pin socket 114, a 9 pin socket 116 and a 3 pin socket 118. Each of the pins of the sockets 114, 116 and 118 serve as output and input interfaces to the electrical components on the circuit board 112. Two pins of the 6 pin socket 114 are connected to the power cord 110 via a transformer 120 to create a 12 volt AC source. Three pins of the 6 pin socket 114 are connected directly to the 120 volt power leads from the power cord 110. The conditioner blower 32 and heating element 34 are coupled to the last pin of the 6 pin socket 114.

The 9 pin socket 116 has two pins connected to the thermocouple 42. Three pins of the 9 pin socket 116 are coupled to an exhaust power line 122, an agitator power line 124, and a kettle heat power line 126 respectively. The exhaust power line 122 powers and activates the exhaust blower 66. The kettle heat line 126 powers the heating elements 40 of the kettle 38 causing the kettle 38 to be heated.

Two pins of the 9 pin socket 116 are connected to a light power line 128 and a thermostat line 130 respectively. When the light line 108 is activated, power is sent to the light 70. The 3 pin socket 118 is connected to an oil pump power line 132 and a preheat oil power line 134. When the oil pump line 132 is activated, the oil pump 60 is powered and injects oil from the oil container 62 into the kettle 38. When the preheat oil line 134 is activated, the heating element 65 in the oil container 62 heats the solid oil.

Figure 3:
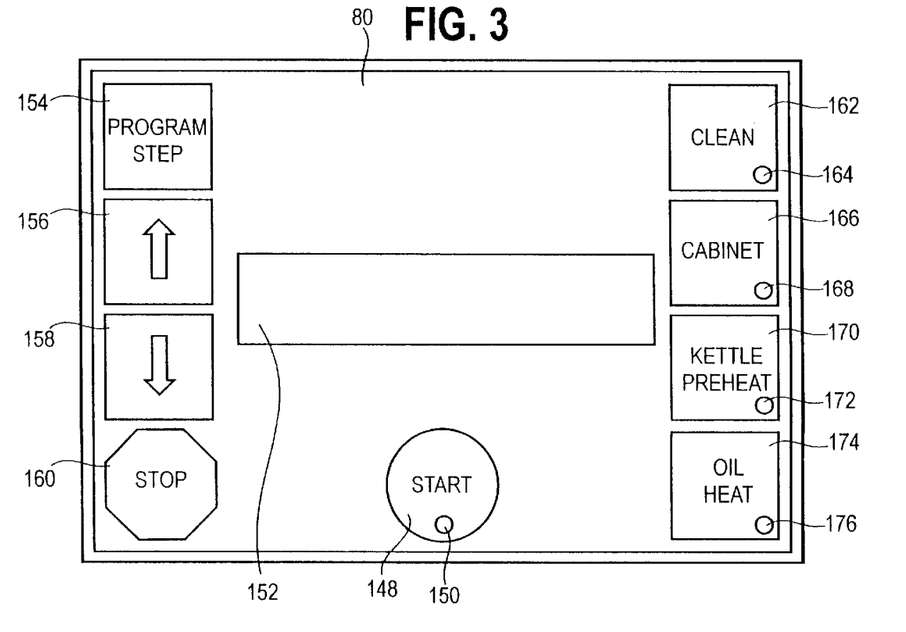
FIG. 3 is a view of the control panel for the popcorn machine according to the present invention.
Figure 4A:
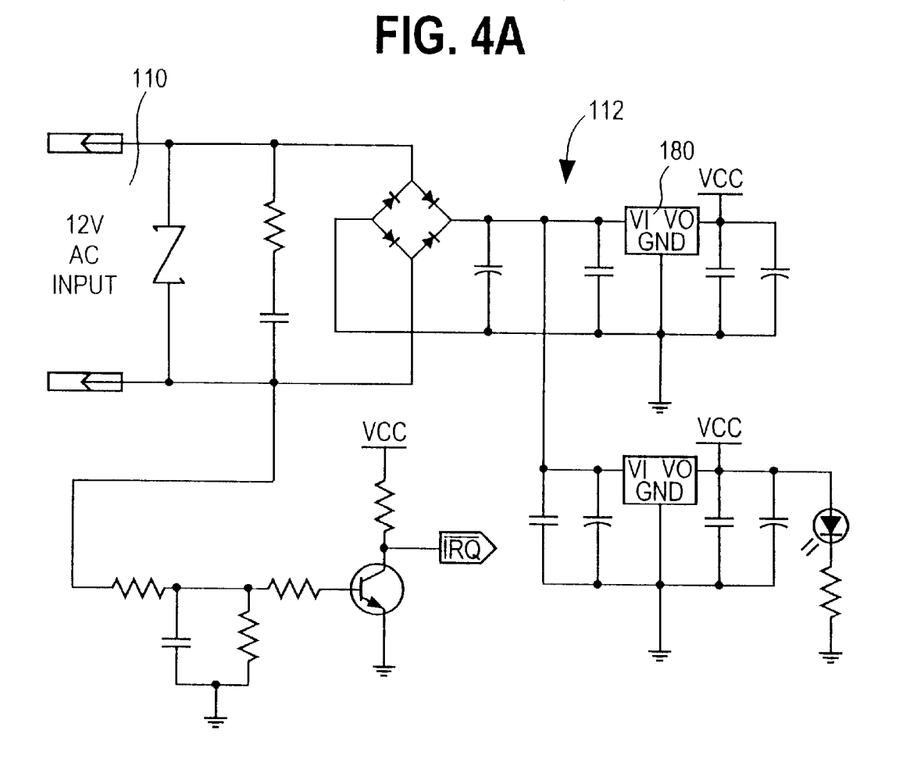
FIGS. 4A–4E is a circuit diagram of the control circuit according to the present invention.
Figure 4B:
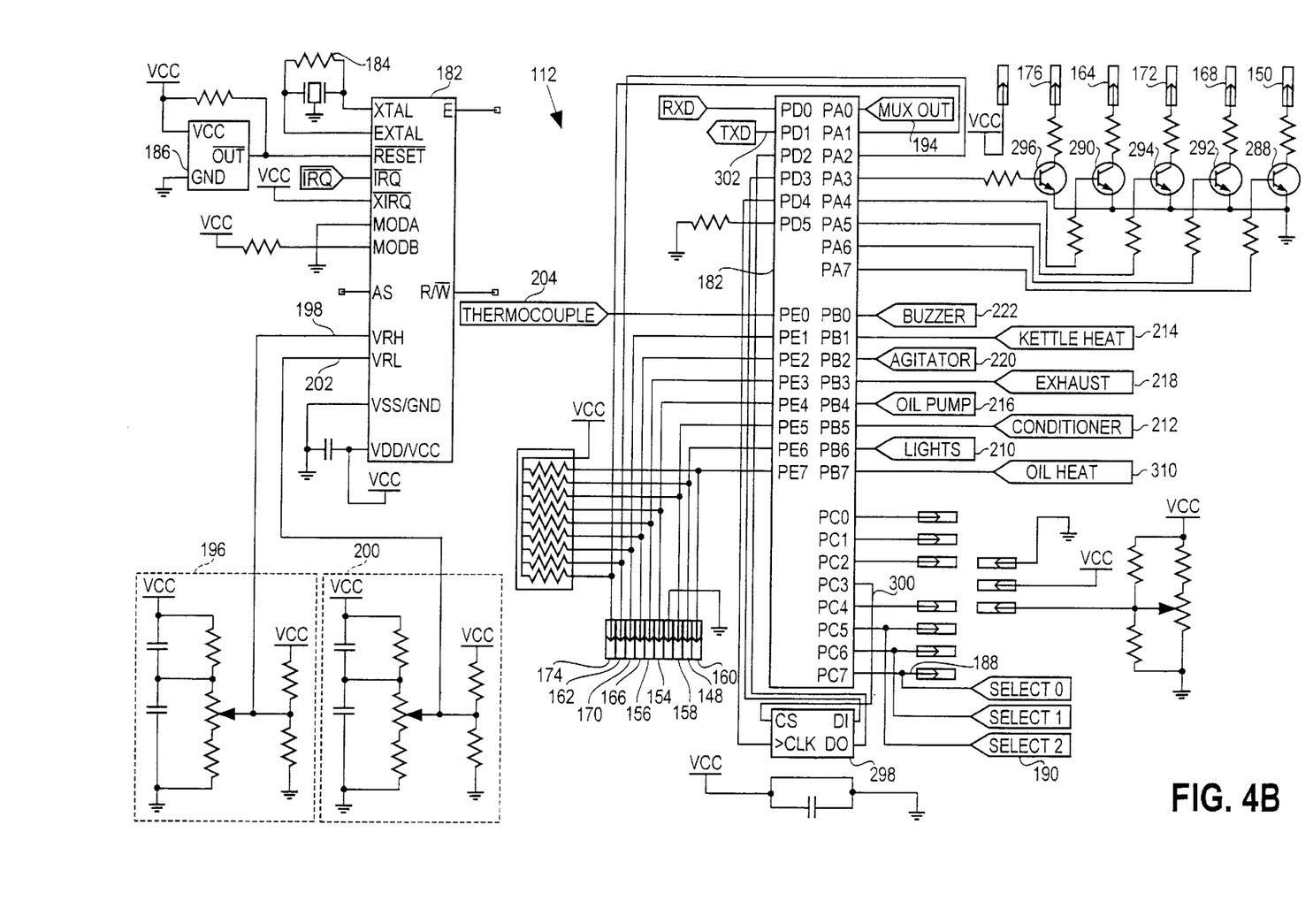
Figure 4C:
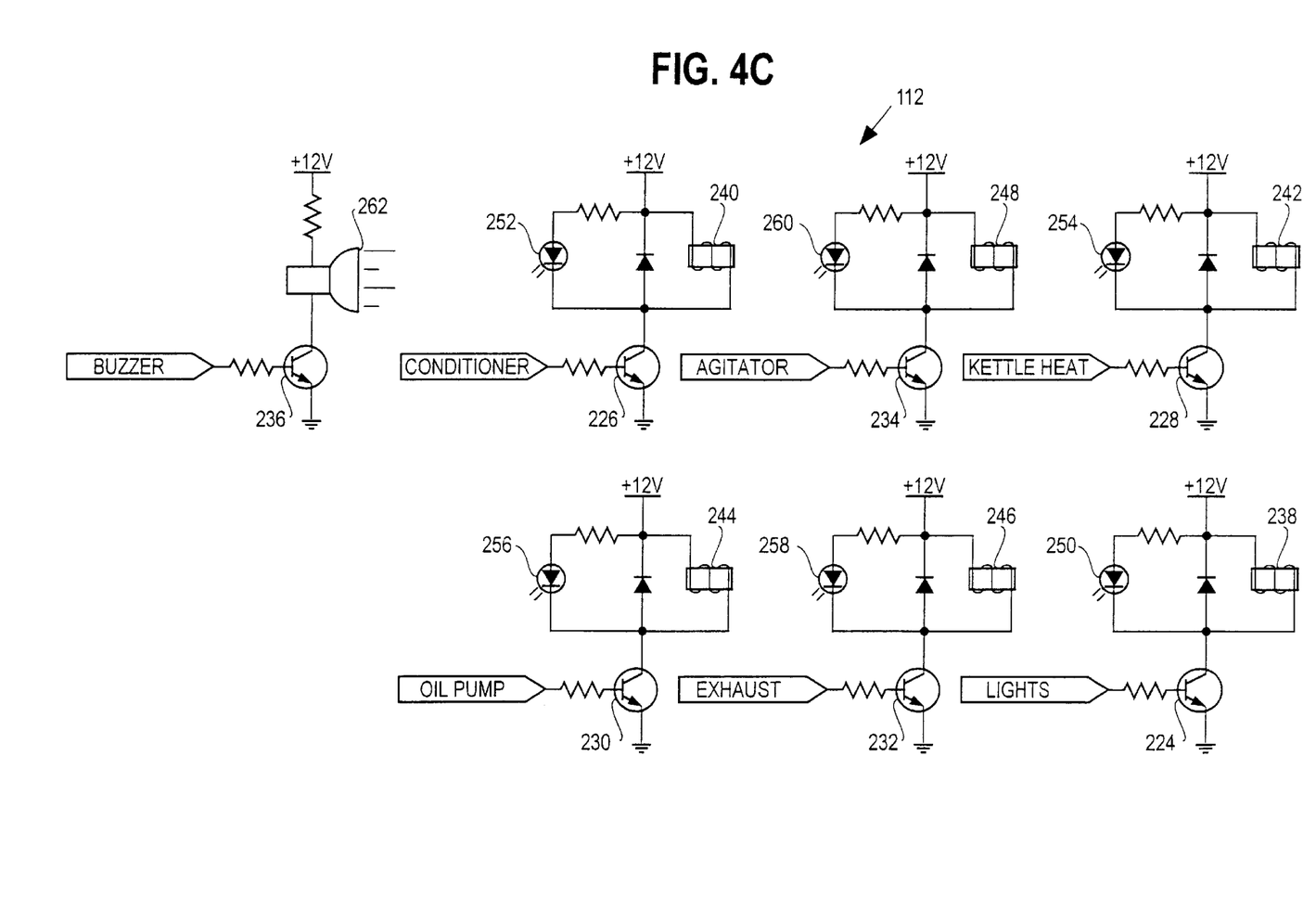
Figure 4D:
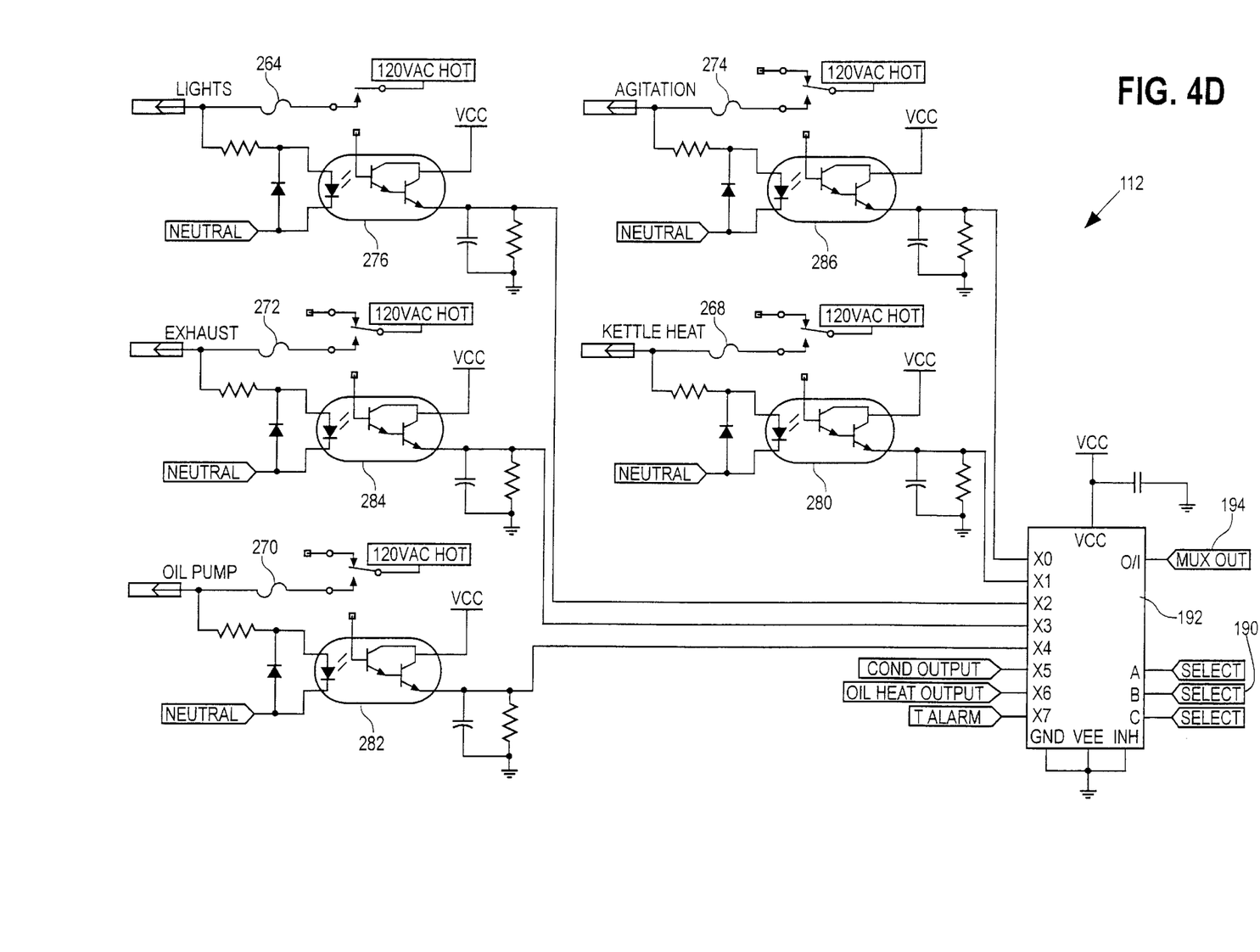
Figure 4E:
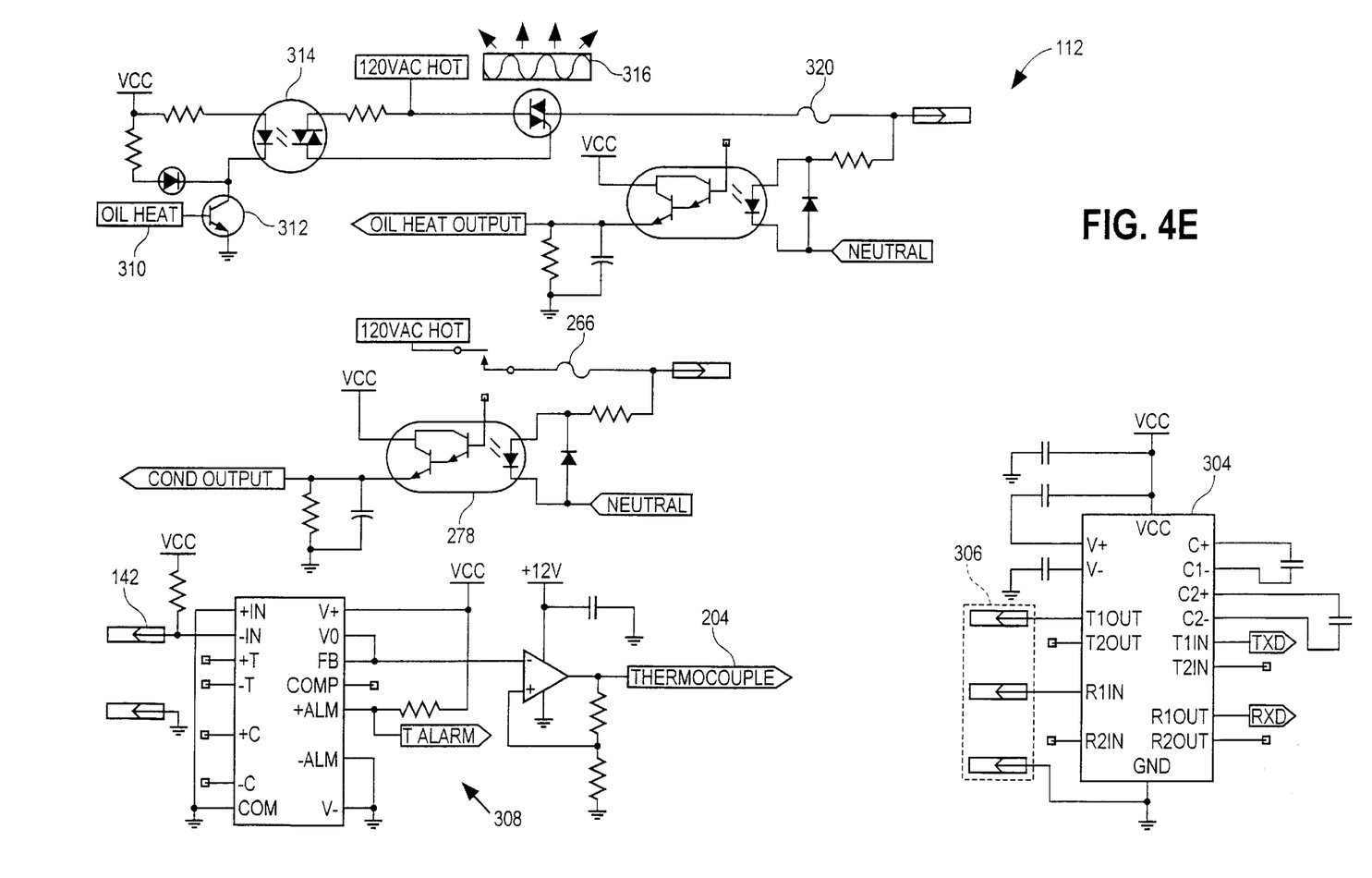

FIG. 3 is a front elevation showing the control panel 80. The control panel 80 has a start button 148 which starts the automatic popping process, which will be detailed below. A light emitting diode (LED) 150 is located on the start button 148 and indicates when the start button 148 has been activated. The control panel 80 has a LCD display 152 which displays status warnings and provides additional options to a user by screen displayed menus. Functions may be activated by using a program/step key 154 in conjunction with arrow control up key 156 and down key 158. Functions may be halted using a stop key 160. The stop key 160 will also stop power flow to all components except for the heating element 65. The programming functions will be explained below.

A clean button 162 with a light emitting diode (LED) 164 is mounted on the control panel 80. The clean button 162 activates the heat elements 40 of the kettle 38 in the popcorn case 12 for a set period of time at a set temperature (190 degrees F. in the preferred embodiment). The agitator 56 is activated until the temperature of the kettle 38 cools down to a selected temperature. The LCD display 152 will display the time remaining in the clean cycle and a beeper will sound at the completion of the cycle.

The control panel 80 also has a cabinet button 166 with a corresponding LED 168. The cabinet button 166 activates the blower 32, the heating element 34 and the light 70 in the popping cabinet 12 to keep popped popcorn warm. The LED 168 indicates that these components are operating.

The control panel 80 also has a kettle preheat button 170 having a light emitting diode (LED) 172. The kettle preheat button 170 activates the heater elements 40 to heat the kettle 38 to a specific temperature and the LED 172 is lit to indicate when the heating elements 40 have been activated. The display 152 will show KETTLE PRE HEAT during the heating of the kettle 38. When the specific temperature is reached, the display 152 will show READY—ADD CORN.

When the kettle preheat button 170 is held for three seconds, the LCD display 152 will read "OIL AMOUNT PROGRAM." By pressing the start button 148 for a set amount of time, a user can measure the amount of oil during that time from the oil pump 62. The control unit 36 will store the amount of time for future use.

The control panel 80 also has an oil heat button 174 with a corresponding LED 176. The oil heat button 174 activates the heating element 65 in the oil container 62 to heat the oil for a period of time sufficient to liquefy the oil, usually 30 minutes. The LED 176 indicates that the oil is being preheated in the oil container 62.

The printed circuit board 112 controls the popping sequence by having electronic components which are connected to the control panel 80. These electronic components integrate all controls and timers in the popcorn machine 10 into one control. FIGS. 4A–4E is a circuit diagram showing the components mounted on printed circuit board 112. The AC source 110 is coupled to a voltage regulation source 180 which produces a DC voltage to power the solid state components mounted on the printed circuit board 1 12. A processor 182 is programmed with the popping sequence which is activated when the start button 148 is pushed. The processor 182 is a Motorola MC68HC11 type microcontroller which is connected to an oscillator crystal clock circuit 184. However, any suitable solid state microprocessor or solid state microcontroller may be used for processor 182. A reset chip 186 is coupled to the processor 182 to reset the internal registers of the processor 182.

The processor 182 has a number of input lines coupled to the control keys 148, 154, 156, 158, 162, 166, 170 and 174 on the control panel 80. The processor 182 has a number of LCD display outputs 188 which drive the LCD display 152. The LCD display outputs 188 of the processor 182 provide data to a user. A series of component selection lines 190 are coupled to the processor 182. The selection unit lines are coupled to the control inputs of an 8:1 multiplexer 192. The component selection input lines 190 allow the processor 182 to select a variety of different sensor inputs to be coupled to a common sensor input 194 of the processor 182.

A high temperature reference circuit 196 is coupled to a high reference input 198 on the processor 182. A low temperature reference circuit 200 is coupled to a low reference input 202 on the microprocessor 182. The high and low temperature reference circuits 196 and 200 are set for resistance values corresponding to accepted temperature ranges for operating the popping unit kettle 38. The processor 182 has a thermocouple input 204 which is used to determine the operating temperature of the kettle 38 in relation to the reference values from the high and low temperature reference circuits 196 and 200.

The processor 182 controls the mechanical and electrical components of the popper 10 via a series of control lines. Specifically these control lines include a lights control line 210, a blower control line 212, a kettle heat line 214, an oil pump line 216, an exhaust control line 218, an agitator control line 220 and an alarm line 222. The control lines 210–220 are each coupled through a resistor to the gate of switching transistors 224–236, respectively. The transistors 224–236 allow power to flow to the relays 238–248, respectively. A series of LEDs 250–260 are wired in parallel with the relays 238–248 which indicate power flow to the respective relay. The LEDs 250–260 are installed on the circuit board 112.

The relays 238–248 are wire coils which are wrapped around magnetic cores. When a signal is sent on one of the control lines 210220, it allows power to energize the coils to create a magnetic force on the respective magnetic core. The magnetic force causes the 120 volt source or the 12 volt source to be connected to the respective power lines 122–134 thus powering the light 70, blower 32 as well as heating element 34, kettle heating elements 40, oil pump 60, exhaust fan 66, and agitator 56. An alarm buzzer 262 is coupled to the switching transistor 236 and is activated by the alarm control line 222.

The relays 238–248 are connected respectively, to fuses 264–274 which are coupled to the power sources. The output to the power sources are coupled to one side of the optical couplers 276–286 which serve to isolate the relays 238–248 from the electronic components on the printed circuit board 112. The other output of the optical couplers 276–286 are coupled to the inputs of the multiplexer 192. The multiplexer 192 allows the processor 182 to sample the output of the optical couplers 276–286 to determine power failure when the fuses 264–274 are broken. On sampling a power failure, the processor 182 will display an appropriate power failure message on the LCD display 152.

The processor 182 outputs LED signals via a series of LED control lines which are coupled to the gate of amplifier BJTs 288–296. The amplifier BJTs 288–296 may be switched on to provide power to the LEDs 150, 164, 168, 172 and 176 which as previously described are lit when their respective devices and control keys are activated by the processor 182.

The processor 182 is coupled to a memory 298. In the preferred embodiment the memory 298 is an EEPROM device with sufficient capability to store the data described below. Of course other memory devices may be used. The processor 182 exchanges data with the memory 298 via a serial data line 300. The processor 182 has an external data output port 302 which is coupled to an RS 232 control chip 304 and allows the output of data which is stored in the memory 298. The RS-232 control chip 304 outputs the serial data signal to an RS-232 connector 306.

The thermocouple 42 is coupled to a signal conditioning circuit 308 which linearizes the output signal from the thermocouple 42. The output of the conditioning circuit 308 is coupled to the thermocouple input 204 of the processor 182.

An oil heat line 310 is coupled to the gate of a switching transistor 312 which allows power to be supplied to an optical coupler 314 which serves to isolate the oil heat line 310 from the electronic components on the printed circuit board 112. The optical coupler 314 is coupled to a relay circuit 316 which cycles the voltage source on and off to the heating element 65 in the oil container 62 to liquefy the oil and keep it at proper temperature. A LED 318 is coupled in parallel to the transistor 312 and is located on the circuit board 112 to indicate that power is supplied to the relay circuit 316. The power to the relay circuit 316 is routed through a fuse 320. The fuse 320 is coupled to an optical coupler 322 which serves to isolate the power from other electronic components. The output of the optical coupler 322 is coupled to the multiplexer 192.

The functioning of the popper control unit 36 will now be described with reference to FIGS. 1–4. The user places sufficient corn kernels in the kettle 38. The user also insures that the oil in the oil container 62 is in a liquid form. In order to activate a complete cooking cycle, the user depresses the start button 148 on the control panel 80. The processor 182 then activates the exhaust blower 66, the agitator 56, and heating elements 40 of the kettle 38 simultaneously by sending signals along their respective control lines 210, 212 and 214.

The processor 182 activates the oil pump 62 by sending a signal along the oil pump control line 216. This signal turns on power from the oil power line 216 to the oil pump 60 via the oil pump relay 244. The processor 182 maintains the signal on the oil pump control line 214 for the time period set by the user via the kettle preheat button 170 or by specific programming as will be explained below. The oil pump 60 thus injects a selected amount of oil into the kettle 38 for a period of time set by the user.

Simultaneously with activating the oil pump 60, the processor 182 sends a signal along the kettle heat control line 214 which activates power to the heating elements 40 in the kettle 38 via the kettle heat relay 242. The processor 182 is programmed to shut off the kettle heat by cutting the signal sent over the kettle heat control line 214 and thus removing power from the kettle heating elements 40. The kettle heat is shut down by the processor 182 a selected time after the start button 148 is pressed, or when the kettle operating temperature is reached, whichever is sooner. The kettle operating temperature is programmed in the processor 182 and monitored by the thermocouple 42 through the thermocouple input 204. Of course, other times may be programmed depending on the user's preferences or other considerations.

As already noted, the processor 182 is also programmed to shut off power to the kettle heating elements 40 after the regulation temperature is reached. The LED 150 then is activated to blink on and off for a set period of time (two minutes in the preferred embodiment). The buzzer 262 is activated for the set period time as well to indicate the completing of the popping cycle. After completion of the cycle, the processor 182 will store the parameters of the cycle such as the type of corn, the amount of oil, elapsed time of popping cycle and the occurrence of the cycle in the memory 298. The LCD display 152 will display POPPING CYCLE during the cooking cycle and displays the elapsed time of the popping cycle.

The signal on the agitator control line 220 activates the motor 54 to rotate the agitator 56 to stir the corn in the kettle 38. After the kettle heat is automatically shut off, the processor 182 will continue to send the signal on the agitator control line 220 for 15 minutes or another specified time. The processor 182 then shuts off the motor 54 via the agitator control line 220.

The processor 182 activates the exhaust blower 66 by sending a signal on the exhaust control line 218. The processor 182 keeps the exhaust blower 66 on for a set time after the kettle heat is shut down. After the set period of time, the processor 182 shuts down the exhaust blower 66, thus ending the popping cycle. During the auto cycle operation, the LED 148 on the start button 150 will begin to flash during the last 2 minutes of the cycle indicating to the user that 2 minutes or less remain in the beat cycle or that the regulation temperature has been reached by the kettle 38.

The oil heat button 174 allows a user to liquify the solid oil in the oil container 62 before activating the cooking cycle described above. Depending on the type of oil pump, the processor 182 may run several different oil heating processes. With a first type of pump, the oil in the container 62 is heated by the heating element 65 until the user presses the oil heat button 174 again. The processor 182 activates the heating element 65 via the oil heat control line 310.

With a second type of oil pump, the processor 182 will activate the heating element 65 for 20 minutes at full power and then powers the heating element 65 at a 10% duty cycle according to the control of the processor 182 until a user presses the oil heat button 174 again. The LED 176 flickers for the full power period and blinks on and off until the oil heat button 174 is pressed again.

A number of safety features are built into the programming for the processor 182. The processor 142 continually senses the kettle temperature via the thermocouple 42 and the conditioning circuit 308. If the kettle temperature reaches a certain number of degrees above the set reference point by the temperature high reference circuit 196, the processor 182 sends a signal along the alarm control line 222 to activate the buzzer 262. The processor 182 also shuts off all the other devices except for the exhaust blower 66. The processor 182 activates the exhaust blower 66 and maintains power to the blower 66 until power is removed from the entire machine 10 or the processor 182 determines that the kettle temperature sensed by the thermocouple 42 has dropped below the threshold temperature. The processor 182 will function normally unless the high temperature alarm is detected a second time, within an eight hour period. If detected, the processor 182 will display a "CALL TO SERVICE" indicator on the display 152. All the devices are then deactivated until the processor 182 is reset via a coded entry. If either leg of the thermocouple 42 is damaged or disconnected, the processor 182 will deactivate all the devices except for the conditioner 30, light 70 and exhaust blower 66. In this case, the processor 182 will display a "CALL FOR SERVICE T COUPLE FAILURE" message on the display 152.

The processor 182 may be programmed to change operation parameters. All programming must be done while controller 36 is in stand-by condition. The stand-by condition exists when the kettle 38 is not cooking, not preheating or not performing cleaning operations as described above. The processor 182 allows a user to select different cooking cycles for producing different popcorn products. For example, salted popcorn and sugared popcorn require different heat from the heating elements 40 in the kettle 38. The program key 154 is depressed for 3 seconds to display the current setting (RECIPE=SUGAR or RECIPE=SALT) on the LCD display 152. The arrow keys 156 and 158 may be used to adjust the setting to a different recipe. When a new program is adjusted, the time and temperature of the heating elements 40 in the kettle 38 are reset to new parameters by the processor 182.

The program key 154 maybe depressed again to display current status of the exhaust fan 66. The up and down arrow keys 156 and 158 may be depressed to adjust the exhaust fan 66 on or off. When the exhaust output is turned on, it will remain energized until shut off. The program key 154 maybe pressed again to exit programming mode or the controller will revert automatically after 10 seconds of inactivity.

Other adjustable parameters maybe adjusted by entering a management level access by pressing and holding the program key 154 and the up arrow key 156 together for five seconds to enter guarded access programming menu. The program key 154 may be depressed to display "PUMP TIME-SALT xx.x seconds or "PUMP TIME-SUGAR xx.x seconds" depending on which mode is currently selected. The up and down arrow keys 156 and 158 are used to adjust the pump time of oil to a desired time. Oil pump time values are adjustable from 5.0 seconds to 30.0 seconds in 0.5 second increments, with a preferred setting of 8 seconds in both modes.

The program key 154 also allows display of language choices, "LANGUAGE=ENGLISH", "SPRACHE= DEUTSCH", "LANGUE=FRANCAIS" or "LENGUAJE= ESPANOL" on the LCD display 152. The up and down arrow keys 156 and 158 are used to select desired language.

The program key 154 maybe used to display "TEMPERATURE=FAHRENHEIT" or "TEMPERATURE=CELSIUS" and use up or down arrow keys 156 and 158 to select the desired temperature mode.

A second programming mode is the technician level access which may be entered by pressing and holding the program key 154 and stop key 160 together for five seconds. This mode allows a user to enter different parameters for the above mentioned cooking modes. The LCD display 152 will offer the user the option to adjust the cooking setpoints. The cooking setpoints for the popping of either salt or sugar corns are adjustable from 350 to 475° F. In order to adjust the setpoints, the LCD display 152 will show "SUGAR SP 385" (Sugar mode with temperature setpoint at 385° F.) or "SALT SP 400" (Salt mode with temperature setpoint at 400° F.) depending on which mode is currently selected. The up or down arrow keys 154 and 156 are used to adjust the kettle temperature to desired setpoint temperature. Setpoint ranges are 350° F. to 475° F. with a preferred setting of 385° F. for sugar mode and a preferred setting of 400° F. for salt mode Of course, different temperature ranges may be used for any of the setpoints.

The pump type may be selected by pressing the program key 154 to display different types of pumps. A first type of pump is used for a large pail of oil such as a 50 pound pail. A second type of pump is used for bags of oil placed in corrugated boxes for easy removal and replacement. Other types of pumps may be programmed and offered as selections.

The processor 182 is coupled to the fuses 264–274 and 318 via the optical couplers 238–240 and 320 through the sensor input line 194 from the multiplexer 190. The processor 182 will initiate a shutdown cycle as described above when the thermocouple 42 senses a high temperature. The processor 182 will also display a warning message on the LCD display 152. The processor 182 has certain error messages which are displayed on the LCD display 152 in the event of an output failure or the activation of any of the fuses 264–274 and 318.

Upon failure of the fuse 268 or relay 242 for the kettle heating elements 40, the processor 182 will control LCD display 152 to display "KH OUTPUT FAILURE; CALL FOR SERVICE." The other relays 238–248 and outputs are shut-down. The cabinet key 166 functions normally by operating the light 70 and conditioner 30 in the case 12.

Upon failure of the agitator fuse 274 or relay 248, the processor 182 will control the LCD display 152 to display "AG OUTPUT FAILURE; CALL FOR SERVICE." The other relays 238–248 and outputs are shut-down. The cabinet key 166 functions normally.

Upon failure of the exhaust fuse 272 or the exhaust relay 246, the processor 182 will control the LCD display 152 to read, "EX OUTPUT FAILURE; CALL FOR SERVICE." The controller 182 operates normally when cycled. The LCD display 152 reverts to the failure message after the cycle is complete.

If the oil pump fuse 270 or oil pump relay 244 fails, the processor 182 will control the LCD display 152 to read "OP OUTPUT FAILURE; CALL FOR SERVICE." The machine operates normally when cycled and thus still can pop corn and warm prepared popcorn. The user will have to manually dispense oil into the kettle 38 in order to pop corn. The LCD display 152 reverts to the failure message after cycle is complete.

Upon failure of the blower fuse 278 or blower relay 240, the processor 182 will control the LCD display 152 to read, "COR OUTPUT FAILURE; CALL FOR SERVICE." The rest of the machine components operate normally when cycled. The LCD display 152 reverts to the failure message after cycle is complete.

Upon failure of the cabinet light fuse 264 or cabinet light relay 238, the processor 182 will control the LCD display 152 to read, "LT OUTPUT FAILURE; CALL FOR SERVICE." The controller 182 operates normally when cycled. The LCD display 152 reverts to the failure message after cycle is complete.

Upon failure of the oil heater fuse 320 or oil heater relay 316, the processor 182 will control the LCD display 152 to read "OPH OUTPUT FAILURE; CALL FOR SERVICE." The oil pump 62 will continue to operate normally.

The processor 182 stores data regarding popping operations and cleaning operations in the memory 298. The processor 182 stores the data in a format which may be transmitted on the RS-232 connector 306 to a computer or another data analysis device. Serial data is the preferred format but any other appropriate data format may be used. The connector 306 is a standard nine pin connector which may be coupled to any compatible data input. The data is stored by day and may be stored for a week. The data includes the number of sugar cycles, the number of salt cycles, the sugar average, the salt average in seconds of the popping time, the oil used in the popping in seconds (which can be converted into ounces) and the number of clean cycles per day. This data may be used for analysis of machine use and other purposes.

The processor 182 may also run a diagnostic cycle which may be activated by powering up the unit 10 with the program key 154 depressed. Alternatively, the diagnostic mode is activated by simultaneously holding the up arrow key 156, down arrow key 158, and cabinet key 166. The LCD display 152 will display the current kettle temperature on the top row and "PUSH 'DOWN' KEY" will be displayed on the bottom row. By pressing the down arrow key 158, the processor 182 will cycle through the key pad LEDs 150, 164, 168, 172 and 174, relays 238–248, and associated onboard LEDs 250–260. If no activity is seen for 15 minutes, or if power to unit is cycled (restarted), or if the program key 154 is pressed, the control unit reverts to normal operation.

The control unit 36 is modular and may be removed from the machine 10 for service or reprogramming of the processor 182 or replacement of components on the circuit board 112. The plugs to connectors 114, 116 and 118 of the circuit board 112 are of a quick connect type for easy removal and installation.

It will be apparent to those skilled in the art that various modifications and variations can be made in the method and system of the present invention without departing from the spirit or scope of the invention. The present invention is not limited by the foregoing descriptions but is intended to cover all modifications and variations that come within the scope of the spirit of the invention and the claims that follow.

What is claimed is:

1. In combination with a popcorn machine including a case for holding popped corn, an electrically heated popcorn kettle located within the case and an oil pump operably connected to a source of popping oil to supply oil to the popcorn kettle, a machine operation system comprising:
   (a) electrical circuitry for connecting the kettle and oil pump to a source of electricity; and
   (b) a processor operably connected to the electrical circuitry to programmably control operation of the kettle and oil pump during a cooking cycle of activating the oil pump to add oil to the kettle, heating the kettle at a set temperature to produce popcorn;
   (c) a display coupled to the processor, the display showing selection choices to change operating parameters for the cooking cycle.

2. The system of claim 1 wherein the display shows status information of the cooking cycle.

3. The system of claim 1 wherein the processor and display are in a control module which is removably coupled to the electrical circuitry and the popcorn machine.

4. The system of claim 1 wherein the popcorn machine further includes a corn agitator positioned within the kettle to stir corn during heating and an exhaust blower which blows air from the case, the processor coupled to the agitator and the blower.

5. The machine operation system of claim 4 wherein said processor is electrically coupled to relays to control operation of the kettle, agitator, exhaust means and oil pump during a cooking cycle.

6. The machine operation system of claim 1 further comprising a control panel having program controls,
   wherein said processor is programmable by the program controls to sequentially heat the kettle for a set period of time, operate the agitator for a set period of time, operate the oil pump for a set period of time, and operate the exhaust means for a set period of time.

7. The machine operation system of claim 1 further comprising:
   a heat sensing means coupled to the kettle to sense the heat of the kettle and having an output coupled to the processor;
   a high temperature circuit coupled to the processor;
   a low temperature circuit coupled to processor;
   wherein the processor compares the output of the heat sensing means to the high and low temperature circuit output to determine if the kettle heat is within the low and high temperature.

8. The machine operation system of claim 7 wherein said heat sensing means is a thermocouple.

9. The machine operation system of claim 7 wherein said heat sensing means is a thermostat.

10. The machine operation system of claim 6 wherein the temperature of the kettle may be set by the programming controls.

11. The system of claim 1 further comprising a memory coupled to the processor, wherein the processor stores data regarding cooking cycles in the memory.

12. The system of claim 11, further comprising an external data connection coupled to the processor, wherein the processor may download data regard cooking cycles from the memory.

13. The system of claim 11 wherein the processor displays the data regarding the cooking cycle on the display.

14. The system of claim 4 wherein the processor electrically activates the kettle, agitator, exhaust means and oil pump to test their operation; and displays diagnostic data regarding the kettle, agitator, exhaust means and oil pump on the display.

15. The system of claim 4 further comprising:
   fuses coupled between the kettle, agitator, exhaust means and oil pump electrical connections and the source of electricity,
   an isolated connection between the fuses and the processor;
   wherein the processor displays a warning message on the display if any of the fuses are triggered.

16. In combination with a popcorn machine including an area for holding popped corn, an electrically heated popcorn kettle located within the case and an oil pump operably connected to a source of popping oil to supply oil to the popcorn kettle, a machine operation system comprising:
   (a) electrical circuitry for connecting the kettle and oil pump to a source of electricity; and
   (b) a microprocessor operably connected to the electrical circuitry to programmably control operation of the kettle and oil pump during a cooking cycle of activating the oil pump to add oil to the kettle and heating the kettle at a set temperature corn to produce popcorn;
   (c) a memory coupled to the processor, the memory storing the number of times a cooking cycle is activated for a set period of time.

17. The machine operation system of claim 16, wherein the processor is programmable to heat the kettle for a first time period at a first temperature for salt corn and a second time period at a second temperature for sugar corn.

18. The machine operation system of claim 17 wherein the memory stores the number of cooking cycles for salt corn and the number of cooking cycles for sugar corn for the set period of time.

19. The machine operation system of claim 16, wherein the memory is an EEPROM.

20. The machine operation system of claim 16 further comprising a data output port coupled to the processor, the processor outputting data stored in the memory through the data output port.

21. The machine operation system of claim 16 further comprising a display coupled to the processor.

22. The machine operation system of claim 21 further comprising programming controls coupled to the processor and wherein the display provides operation parameters for the cooking cycle which may be altered by the programming controls.

23. The machine operation system of claim 21 wherein display shows status information of the cooking cycle.

24. The system of claim 21 wherein the processor, memory and display are in a control module which is removably coupled to the electrical circuitry and the popcorn machine.

25. The machine operation system of claim 16 further comprising:
   a thermocouple coupled to the kettle to sense the heat of the kettle and having an output coupled to the processor;
   a high temperature circuit coupled to the processor;
   a low temperature circuit coupled to processor;
   wherein the processor compares the output of the heat sensing means to the high and low temperature circuit output to determine if the kettle heat is within the low and high temperature.

* * * * *